United States Patent
Marty (10) Patent No.: US 8,988,054 B2
(45) Date of Patent: Mar. 24, 2015

(54) SINGLE FEEDBACK LOOP FOR PARALLEL ARCHITECTURE BUCK CONVERTER—LDO REGULATOR

(75) Inventor: Nicolas Marty, Saint Egreve (FR)

(73) Assignee: ST-Ericsson SA, Plan-les-Ouates (CH)

( * ) Notice: Subject to any disclaimer, the term of this patent is extended or adjusted under 35 U.S.C. 154(b) by 428 days.

(21) Appl. No.: 13/337,939

(22) Filed: Dec. 27, 2011

(65) Prior Publication Data

US 2013/0162233 A1 Jun. 27, 2013

(51) Int. Cl.
*G05F 1/40* (2006.01)
*H02M 3/158* (2006.01)
*H02M 1/00* (2006.01)

(52) U.S. Cl.
CPC ...... *H02M 3/158* (2013.01); *H02M 2001/0045* (2013.01)
USPC .......................................... 323/273; 323/282

(58) Field of Classification Search
CPC ........... H02M 3/00; H02M 3/02; H02M 3/04; H02M 3/145; H02M 3/155; H02M 3/156
USPC .......... 323/266, 268, 271, 273, 282–284, 351
See application file for complete search history.

(56) References Cited

U.S. PATENT DOCUMENTS

| | | | | |
|---|---|---|---|---|
| 4,881,023 A * | 11/1989 | Perusse et al. | ................. | 323/266 |
| 5,627,460 A * | 5/1997 | Bazinet et al. | ................. | 323/288 |
| 5,731,731 A * | 3/1998 | Wilcox et al. | ................. | 327/403 |
| 5,864,225 A * | 1/1999 | Bryson | ......................... | 323/268 |
| 6,229,289 B1 | 5/2001 | Piovaccari et al. | | |
| 6,636,023 B1 * | 10/2003 | Amin | ............................. | 323/268 |
| 6,661,210 B2 * | 12/2003 | Kimball et al. | ................ | 323/268 |
| 7,064,531 B1 * | 6/2006 | Zinn | ............................. | 323/268 |
| 7,148,670 B2 * | 12/2006 | Inn et al. | ........................ | 323/283 |
| 7,230,408 B1 * | 6/2007 | Vinn et al. | .................... | 323/273 |
| 7,602,167 B2 * | 10/2009 | Trafton et al. | ................. | 323/284 |
| 7,679,350 B2 * | 3/2010 | Falvey et al. | .................. | 323/284 |
| 7,701,181 B2 * | 4/2010 | Inoue | ............................ | 323/268 |
| 7,812,580 B2 * | 10/2010 | Watanabe et al. | ............. | 323/268 |
| 7,990,120 B2 * | 8/2011 | Leonard et al. | ............... | 323/282 |
| 2010/0060078 A1 | 3/2010 | Shaw | | |

FOREIGN PATENT DOCUMENTS

| | | |
|---|---|---|
| EP | 1801959 A2 | 6/2007 |
| EP | 2226699 A2 | 9/2010 |
| JP | 2003009515 A | 1/2003 |
| WO | 2005085969 A1 | 9/2005 |
| WO | 2009014826 A1 | 1/2009 |

\* cited by examiner

*Primary Examiner* — Adolf Berhane
(74) *Attorney, Agent, or Firm* — Howison & Arnott, LLP (57) ABSTRACT

An embodiment of a voltage regulation circuit includes a DC-DC converter configured to control a first current provided from a source to a load via a first output, and a linear regulator configured to control a second current provided from the source to the load via a second output. The voltage regulation circuit further includes a single control loop configured to receive an output voltage across the load and a first reference voltage. The single control loop is further configured to generate a single error signal between the output voltage across the load and the first reference voltage and to control the DC-DC converter and the linear regulator using the single error signal such that when the single error signal is outside of a predetermined range the DC-DC converter provides the first current to the load and the linear regulator provides the second current to the load simultaneously.

18 Claims, 6 Drawing Sheets

SINGLE FEEDBACK LOOP FOR PARALLEL ARCHITECTURE BUCK CONVERTER—LDO REGULATOR

TECHNICAL FIELD

Embodiments of the invention relate to voltage regulation and more particularly to voltage regulation using a direct current to direct current (DC-DC) converter and a linear regulator.

BACKGROUND

Due to increasing power consumption requirements in mobile phone applications, batteries are used from their nominal voltage value down to a lower value where energy is still stored inside and available for use. For that purpose, regulators and buck converters are used in a wide range of supply voltages. As a result, it is necessary that voltage regulation occur in both large drop-out voltage conditions in which the required voltage is substantially less than the supply voltage and low drop-out conditions in which the required voltage is close to the supply voltage. Step-down direct current to direct current (DC-DC) converters provide good efficiency when used under large drop-out voltage conditions. However, DC-DC converters require a coil to work which increases the resistive path between the battery and the output point to be regulated. As a result, the minimum drop-out voltage between battery voltage and output voltage is quite large. As a consequence, the drop-out voltage between battery voltage and output voltage is limited. In contrast, low dropout (LDO) regulators have good efficiency with a low dropout voltage but have poor efficiency with a large drop-out voltage.

SUMMARY

An embodiment of a voltage regulation circuit includes a direct current to direct current (DC-DC) converter configured to control a first current provided from a source to a load via a first output, and a linear regulator configured to control a second current provided from the source to the load via a second output. The voltage regulation circuit further includes a single control loop configured to receive an output voltage across the load and a first reference voltage. The single control loop is further configured to generate a single error signal between the output voltage across the load and the first reference voltage and to control the DC-DC converter and the linear regulator using the single error signal such that when the single error signal is outside of a predetermined range the DC-DC converter provides the first current to the load and the linear regulator provides the second current to the load simultaneously.

In some embodiments, the control loop is further configured to control the DC-DC converter and the linear regulator using the single error signal such that when the single error signal is within the predetermined range the DC-DC converter provides the first current to the load and the linear regulator does not provide the second current to the load.

In some embodiments, the DC-DC converter is a buck converter. In some embodiments, the linear regulator is a low dropout (LDO) regulator.

In some embodiments, the single control loop includes an integrator configured to receive the output voltage and the first reference voltage, and integrate an error between the output voltage and the first reference voltage to generate the single error signal.

In some embodiments, the DC-DC includes a signal generator configured to generate a periodic signal varying between a maximum value and a minimum value, and a comparator configured to receive the single error signal from the integrator and the period signal from the signal generator. The comparator is further configured to compare the single error signal and the periodic signal and generate a first control signal based upon the comparing to control the providing of the first current from the source to the load.

In some embodiments, the linear regulator includes a differential amplifier having a negative input configured to receive the single error signal from the integrator and a positive input configured to receive a second reference voltage. The second reference voltage is equal to the maximum value of the periodic signal plus a predetermined threshold value. When the single error signal is greater than or equal to the second reference voltage the differential amplifier is further configured to generate a second control signal to enable the providing of the second current from the source to the load.

In some embodiments, when the single error signal is less than the second reference voltage the differential amplifier is configured to disable the providing of the second current from the source to the load.

In some embodiments, the first output of the DC-DC converter is coupled to the second output of the linear regulator.

In some embodiments, the predetermined range includes an operational voltage range of the DC-DC converter in which the DC-DC converter is not in a saturation mode.

An embodiment of a method of regulating voltage delivered to a load includes controlling, by a direct current to direct current (DC-DC) converter, a first current provided from a source to a load via a first output; and controlling, by a linear regulator, a second current provided from the source to the load via a second output. The method further includes receiving, by a single control loop, an output voltage across the load and a first reference voltage; and generating, by the single control loop, a single error signal between the output voltage across the load and the first reference voltage. The method still further includes controlling the DC-DC converter and the linear regulator using the single error signal such that when the single error signal is outside of a predetermined range the DC-DC converter provides the first current to the load and the linear regulator provides the second current to the load simultaneously.

In some embodiments, the method further includes controlling the DC-DC converter and the linear regulator using the single error signal such that when the single error signal is within the predetermined range the DC-DC converter provides the first current to the load and the linear regulator does not provide the second current to the load.

In some embodiments, the generating of the single error signal further includes receiving the output voltage and the first reference voltage, and integrating an error between the output voltage and the first reference voltage to generate the single error signal.

In some embodiments, controlling the first current by the DC-DC converter further includes generating a periodic signal varying between a maximum value and a minimum value, receiving the single error signal by a comparator, receiving the periodic signal by the comparator, comparing, by the comparator, the single error signal and the periodic signal, and generating, by the comparator, a first control signal based upon the comparing to control the providing of the first current from the source to the load.

In some embodiments, controlling the second current by the linear regulator further includes receiving the single error signal at a negative input of a differential amplifier, and receiving a second reference voltage at a positive input of the differential amplifier in which the second reference voltage is equal to the maximum value of the periodic signal plus a predetermined threshold value. In such embodiments, the method further includes generating, by the differential amplifier, a second control signal to enable the providing of the second current from the source to the load when the single error signal is greater than or equal to the second reference voltage.

In some embodiments, the method includes disabling the providing of the second current from the source to the load when the single error signal is less than the second reference voltage.

BRIEF DESCRIPTION OF THE DRAWINGS

For a more complete understanding, reference is now made to the following description taken in conjunction with the accompanying Drawings in which.

DETAILED DESCRIPTION

Referring now to the drawings, wherein like reference numbers are used herein to designate like elements throughout, the various views and embodiments of a single feedback loop for parallel architecture buck converter—LDO regulator are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Various embodiments provide for an apparatus and method for regulating voltage delivered to a load in which a DC-DC converter and linear regulator are arranged in a parallel architecture and are controlled by a single feedback loop. In various embodiments, the DC-DC converter is configured to control a first current provided from a source to the load via an output of the DC-DC converter, and a linear regulator is configured to control a second current provided from the source to the load via an output of the linear regulator. A single control loop is configured to receive an output voltage across the load as a feedback signal as well as a reference voltage signal. The single control loop generates a single error signal between the output voltage across the load and the reference voltage and the single error signal is used to control both the DC-DC converter and the linear regulator. When the single error signal is within a predetermined voltage range, the DC-DC converter provides the first current to the load and the linear regulator does not provide the second current to the load. When the single error signal is outside of the predetermined voltage range, the DC-DC converter provides the first current to the load and the linear regulator also provides the second current to the load such that during a period of time the first current and the second current are provided to the load simultaneously. In various embodiments, the predetermined voltage range is a voltage range in which the DC-DC converter is operating in a normal mode of operation and is not in saturation. In this case, the DC-DC converter regulates the output voltage and provides the load current to the load. In such embodiments, when the error signal is outside of the predetermined voltage range the DC-DC converter is in saturation and is no longer able to regulate the output voltage or provide additional current to the load. In such a case, the linear regulator provides additional current to the load and regulates the output voltage.

Figure 1:
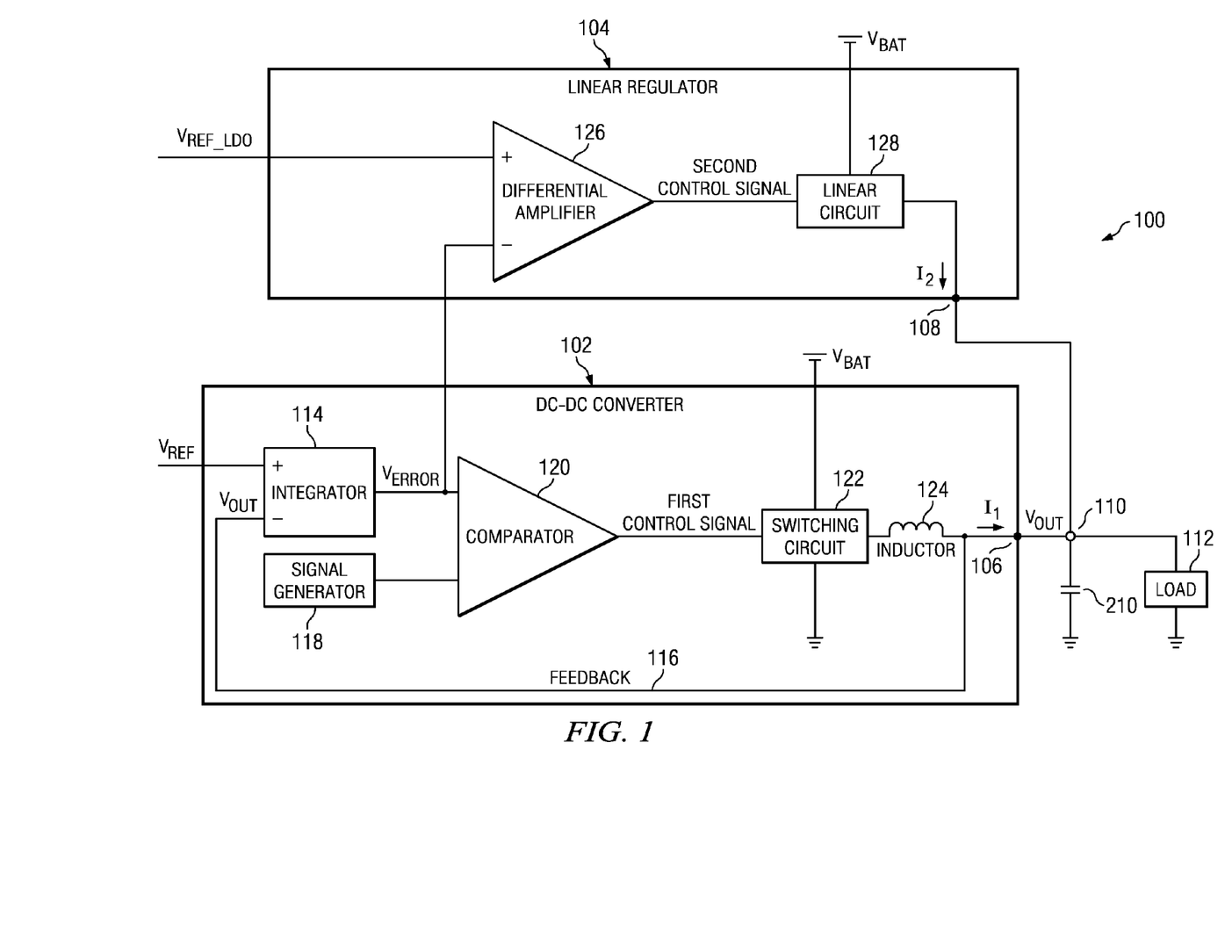
FIG. 1 illustrates an embodiment of a voltage regulation circuit having a DC-DC converter and linear regulator arranged in a parallel architecture and controlled by a single feedback loop.

FIG. 1 illustrates an embodiment of a voltage regulation circuit 100 having a DC-DC converter 102 and linear regulator 104 arranged in a parallel architecture and controlled by a single feedback loop. In at least one embodiment, the voltage regulation circuit 100 is embodied in a mobile communication device such as a cell phone, smart phone, PDA, or any other mobile communication device. In still other embodiments, the voltage regulation circuit 100 may be embodied in a microchip or other circuitry used in any type of device in which voltage regulation is used. The DC-DC converter 102 includes a DC-DC converter output 106 and the linear regulator 104 has a linear regulator output 108, each coupled to a common output node 110. The common output node 110 is further coupled to an output capacitor 210 and a load 112. The DC-DC converter 102 includes an integrator 114 having a positive input coupled to a first reference voltage $V_{REF}$ and a negative input coupled to a feedback loop 116 to receive an output voltage $V_{OUT}$ from the DC-DC converter output 106. The first reference voltage $V_{REF}$ is an input signal having a value that may be varied according to a desired value of the output voltage $V_{OUT}$. The value of $V_{OUT}$ is equal to the gain of the DC-DC converter 102 multiplied by the first reference voltage $V_{REF}$ such that $V_{OUT}=GAIN*V_{REF}$ where GAIN is equal to the gain of the DC-DC converter 102. The integrator 114 integrates the first reference voltage $V_{REF}$ and the output voltage $V_{OUT}$ to generate a single error signal $V_{ERROR}$ as an output. The DC-DC converter 102 further includes a signal generator 118 configured to generate a periodic signal that varies between a maximum value and a minimum value. In a particular embodiment, the signal generator 118 is a ramp generator configured to generate a ramp signal. The DC-DC converter 102 further includes a comparator 120 having a first input configured to receive the error signal $V_{ERROR}$ and a second input configured to receive the periodic signal from the signal generator 118. The comparator 120 compares the single error signal and the periodic signal and generates a first control signal based upon the comparison, and provides the first control signal to a switching circuit 122. In a particular embodiment, the first control signal is a pulse width modulated (PWM) signal. In response to the first control signal, the switching circuit 122 couples and decouples a source $V_{BAT}$ to a first terminal of an inductor 124. A second terminal of the inductor 124 outputs an output signal having a first current $I_1$ and a voltage value $V_{OUT}$ to the output capacitor 210 and the load 112.

The linear regulator 104 includes a differential amplifier 126 having a positive input configured to receive a second reference voltage $V_{REF\_LDO}$ and a negative input configured to receive the error signal $V_{ERROR}$ from the DC-DC converter 102. In a particular embodiment, the second reference voltage $V_{REF\_LDO}$ is equal to the maximum value of the periodic signal generated by the signal generator 118 plus a predetermined threshold value. In a particular embodiment, the predetermined threshold is 5% of the voltage swing between the maximum value and minimum value of the periodic signal output by the signal generator 118. The differential amplifier 126 generates a second control signal and provides the second control signal to a linear circuit 128 of the linear regulator 104. The second control signal controls a coupling and uncoupling of the source $V_{BAT}$ to the linear regulator output 108. When the single error signal is greater than or equal to the second reference voltage $V_{REF\_LDO}$, the second control signal generated by the differential amplifier 126 enables providing of an output signal having a second current $I_2$ from the source $V_{BAT}$ to the load 112 by coupling the linear regulator output 108 to the source $V_{BAT}$. When the single error signal is less than the second reference voltage $V_{REF\_LDO}$, the second control signal from the differential amplifier 126 disables the providing of the second current $I_2$ from the source $V_{BAT}$ to the load 112.

As long as the error signal $V_{ERROR}$ is within a predetermined voltage range bounded by the maximum and minimum values of the periodic signal generated by the signal generator 118, the DC-DC converter 102 provides the current $I_1$ to the load 112 and no additional current is provided by the linear regulator 104. However, when the error signal $V_{ERROR}$ is outside of the predetermined voltage range, the linear regulator 104 provides additional current $I_2$ to the load 112 in addition to the current $I_1$ provided by the DC-DC converter 102. In a particular embodiment, the linear regulator 104 provides the current $I_2$ to the load 112 when the error signal $V_{ERROR}$ is greater than or equal to the second reference voltage $V_{REF\_LDO}$. In a particular embodiment, the error signal $V_{ERROR}$ being greater than or equal to the second reference voltage $V_{REF\_LDO}$ is representative of the DC-DC converter 102 operating in a saturation mode. When the DC-DC converter 102 is operating in a saturation mode it is no longer able to provide additional current to the load 112. In such a case the linear regulator 104 provides the needed additional current to the load 112 to compensate for the inability of the DC-DC converter 102 to provide the needed current.

Figure 2:
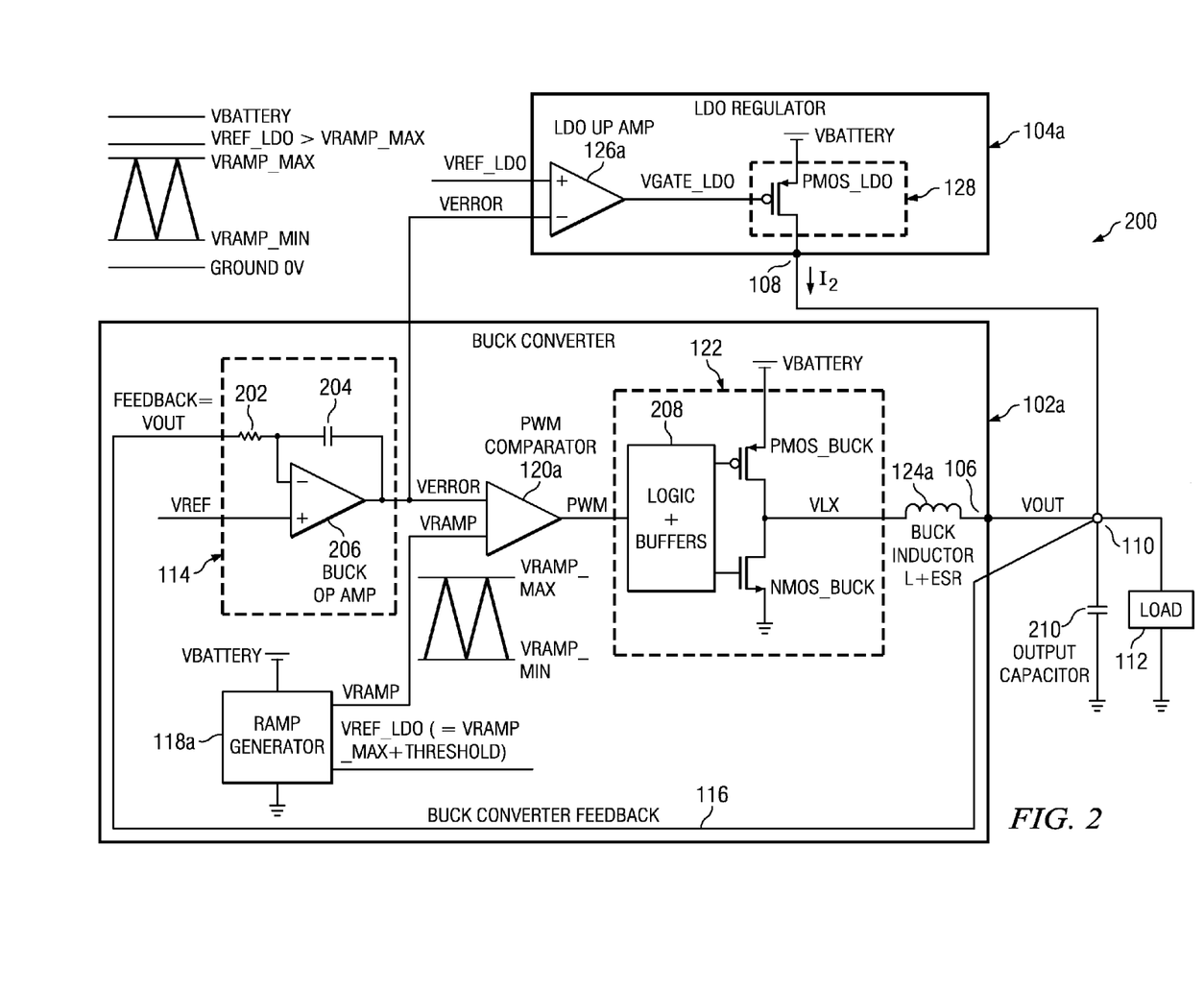
FIG. 2 illustrates a particular embodiment of the voltage regulation circuit of FIG. 1 in which the DC-DC converter is a buck converter and the linear regulator is an LDO regulator.

FIG. 2 illustrates a particular embodiment 200 of the voltage regulation circuit 100 of FIG. 1 in which the DC-DC converter 102 is a buck converter 102a and the linear regulator 104 is a low drop-out (LDO) regulator 104a. A buck converter is a type of step-down DC-DC switching converter. The buck converter uses one or more transistor switches to pulse width modulate a voltage into an inductor. The output of the inductor produces a signal having a voltage which is a function of the pulse width of the pulse width modulated signal. A feedback loop is provided at the output of the buck converter, and the output voltage of the buck converter is compared to a reference value to adjust the output voltage to a desired voltage value. A buck converter provides good efficiency when used in large drop-out conditions, that is, when the voltage drop between the supply voltage and the desired output voltage is large enough to prevent the buck converter from operating in a saturation mode. However, when the buck converter is operating in a saturation mode such that the buck converter has a 100% pulse width modulation (PWM) duty cycle, the source current provided by the buck converter s saturated and the buck converter no longer has the ability to provide additional current to a load. Accordingly, the buck converter is not suitable for use under small drop-out conditions when the desired output voltage is close to the supply voltage.

A low drop-out (LDO) regulator is a DC linear voltage regulator that can operate with a very small input-output differential voltage. An LDO regulator provides for high efficiency during low drop-out conditions but provides for poor efficiency with a large drop-out voltage. An LDO includes a differential amplifier which receives an error signal and a reference voltage. The output of the differential amplifier controls the turning on or off of one or more transistors in order to couple a source to an output of the LDO regulator to provide output current to a load.

In the particular embodiment illustrated in FIG. 2, the integrator 114 of the buck converter 102a includes an integrator resistor 202, an integrator capacitor 204, and a buck operational amplifier (op amp) 206. The integrator resistor 202 has a first terminal coupled to receive the feedback signal $V_{OUT}$ from the DC-DC converter output 106 and a second terminal coupled to the negative input of the buck op amp 206. The positive input of the buck op amp 206 is coupled to a first reference voltage $V_{REF}$. The first reference voltage $V_{REF}$ is an input signal having a value that may be varied according to a desired value of the output voltage $V_{OUT}$. The integrator capacitor 204 is coupled between the negative input of the buck op amp 206 and an output of the buck op amp 206. The integrator 114 integrates the $V_{REF}$ and $V_{OUT}$ signals to produce the error signal $V_{ERROR}$. In the embodiment illustrated in FIG. 2, the signal generator 118 is a ramp generator 118A. The ramp generator 118A is coupled to a source $V_{BATTERY}$ and generates a ramp waveform $V_{RAMP}$ having a maximum value $V_{RAMP\_MAX}$ and a minimum value $V_{RAMP\_MIN}$. In example embodiments, the value of $V_{RAMP\_MAX}-V_{RAMP\_MIN}$ is one or two volts (1V or 2V). The ramp generator 118a further generates a second reference voltage $V_{REF\_LDO}$ which is equal to $V_{RAMP\_MAX}$+a predetermined threshold value. In some embodiments, the predetermined threshold may be a certain percentage value of a dynamic range of $V_{RAMP\_MAX}-V_{RAMP\_MIN}$. In a particular embodiment, the predetermined threshold may be five percent (5%) of $V_{RAMP\_MAX}-V_{RAMP\_MIN}$.

In the embodiment illustrated in FIG. 2, the comparator 120 is a pulse width modulated (PWM) comparator 120a. The PWM comparator 120a receives the error signal $V_{ERROR}$ and the periodic ramp signal $V_{RAMP}$ and generates a pulse width modulation signal (PWM) to the switching circuit 122. In the embodiment illustrated in FIG. 2, the switching circuit 122 includes logic and buffers 208 having a first output coupled to a gate of a PMOS transistor PMOS_BUCK and a second output connected to a gate of an NMOS transistor NMOS_BUCK. A source of the PMOS transistor PMOS_BUCK is coupled to the source voltage $V_{BATTERY}$ and a drain of the PMOS transistor PMOS_BUCK is connected to a drain of the NMOS transistor NMOS_BUCK. A source of the NMOS transistor NMOS_BUCK is connected to ground. Additionally, the drain of the PMOS transistor PMOS_BUCK and the drain of the NMOS transistor NMOS_BUCK are coupled to an input of buck inductor 124a. The duty cycle of the PWM signal provided by PWM comparator 120a controls the conduction of the PMOS transistor PMOS_BUCK and the NMOS transistor NMOS_BUCK such that when the PWM signal is equal to 1, the PMOS transistor PMOS_BUCK is in conduction and the NMOS transistor NMOS_BUCK is open. When the PWM signal is equal to zero, the NMOS transistor NMOS_BUCK is in conduction and the PMOS transistor PMOS_BUCK is open. Buck inductor 124a is further coupled to the buck converter output 106 which is further coupled to common output node 110. An output capacitor 210 and the load 112 are further coupled to the common output node 110.

During operation of the buck converter 102a, as long as the feedback signal $V_{OUT}$ is lower than $V_{REF}$, $V_{ERROR}$ is increasing and the duty cycle of the PWM signal is increasing. As a result the PMOS transistor PMOS_BUCK is sourcing current to the buck inductor 124a and a result $V_{OUT}$ increases in order to have correct voltage regulation. As long as the feedback signal $V_{OUT}$ is higher than $V_{REF}$, $V_{ERROR}$ is decreasing and the duty cycle of the PWM signal decreases. As a result, the NMOS transistor NMOS_BUCK is sinking current from the buck inductor 124a and $V_{OUT}$ decreases to have correct voltage regulation.

In the particular embodiment illustrated in FIG. 2, the linear regulator 104 is an LDO regulator 104a. The LDO regulator 104a includes an LDO operational amplifier (op amp) 126a having a positive input coupled to the second reference voltage $V_{REF\_LDO}$ and a negative input coupled to receive the error signal $V_{ERROR}$ output from the integrator 114 of the buck converter 102a. The LDO op amp 126a operates as a differential amplifier to generate an output signal $V_{GATE\_LDO}$ representative of a difference between the second reference signal $V_{REF\_LDO}$ and the error signal $V_{ERROR}$. The output signal $V_{GATE\_LDO}$ is provided to the linear circuit 128 which includes a PMOS transistor PMOS_LDO. The output signal $V_{GATE\_LDO}$ is provided to a gate of the PMOS transistor PMOS_LDO and a source of the PMOS transistor PMOS_LDO is coupled to the voltage source $V_{BATTERY}$. In a particular example, the voltage value of $V_{GATE\_LDO}$ is 0.7V. A drain of the PMOS transistor PMOS_LDO is coupled to the LDO regulator output 108. The LDO regulator output 108 is further coupled to the common output node 110. In operation of the LDO regulator 104a, as long as the error signal $V_{ERROR}$ is lower than the second reference signal $V_{REF\_LDO}$, $V_{GATE\_LDO}$ is tied to $V_{BATTERY}$ and the LDO regulator 104A cannot sink current to the common output node 110. However, if $V_{ERROR}$ is higher than or equal to the second reference voltage $V_{REF\_LDO}$, $V_{GATE\_LDO}$ is decreasing and the PMOS transistor PMOS_LDO is sourcing current to the common output node 110. As a result $V_{OUT}$ is increasing to insure voltage regulation. Accordingly, during large drop-out conditions, the buck converter 102a provides current to the load 112 to regulate the output voltage $V_{OUT}$ and the LDO regulator 104a makes no contribution of current to the load 112. However, under small drop-out conditions, the buck converter 102a is in a saturation mode and current is provided to the load 112 by both the buck converter 102a and the LDO regulator 104a.

Figure 3:
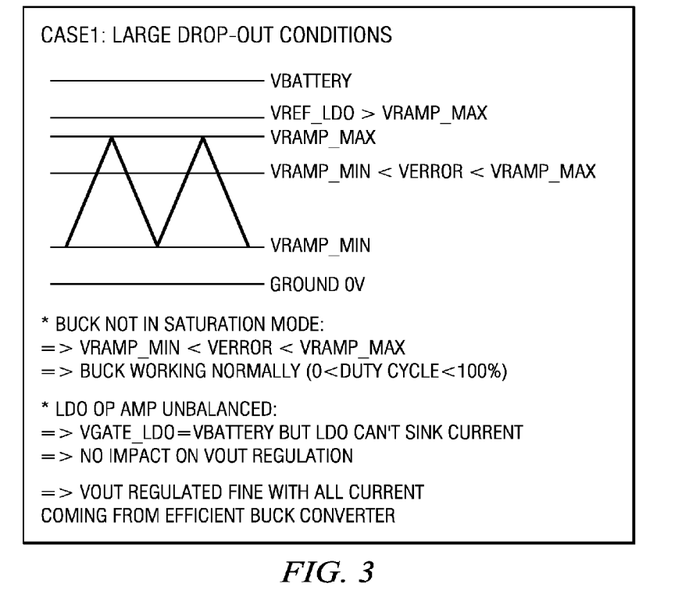
FIG. 3 illustrates an example of the value of the error signal $V_{ERROR}$ in relation to the maximum voltage ($V_{RAMP\_MAX}$) and minimum voltage ($V_{RAMP\_MIN}$) of the ramp generator 118a of FIG. 2 under large drop-out conditions.

FIG. 3 illustrates an example of the value of the error signal $V_{ERROR}$ in relation to the maximum voltage ($V_{RAMP\_MAX}$) and minimum voltage ($V_{RAMP\_MIN}$) of the ramp generator 118a of FIG. 2 under large drop-out conditions. In the large drop-out conditions illustrated in FIG. 3, $V_{ERROR}$ lies between $V_{RAMP\_MIN}$ and $V_{RAMP\_MAX}$. Under this condition, the buck converter 102a is not in a saturation mode and is working normally having a duty cycle between zero percent (0%) and one hundred percent (100%). Since the buck converter 102a is operating normally inside the buck converter dynamic range, that is the error signal $V_{ERROR}$ is between $V_{RAMP\_MIN}$ and $V_{RAMP\_MAX}$, and since the LDO regulator 104a can only source current and not sink current, the LDO control loop is unbalanced. As a result $V_{GATE\_LDO}$ is tied to the battery supply voltage $V_{BATTERY}$ and does not disturb the buck control loop because it has no effect on the output voltage $V_{OUT}$. As a result $V_{OUT}$ is entirely regulated by the current supplied by the buck converter 102a in an adequate manner.

Figure 4:
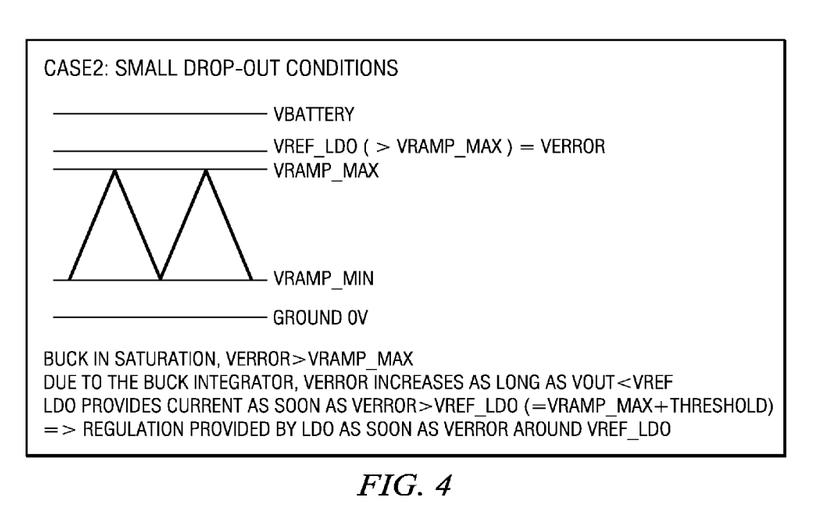
FIG. 4 illustrates an example of the value of the error signal $V_{ERROR}$ in relation to the maximum voltage ($V_{RAMP\_MAX}$) and minimum voltage ($V_{RAMP\_MIN}$) of the ramp generator 118a of FIG. 2 under small drop-out conditions.

FIG. 4 illustrates an example of the value of the error signal $V_{ERROR}$ in relation to the maximum voltage ($V_{RAMP\_MAX}$) and minimum voltage ($V_{RAMP\_MIN}$) of the ramp generator 118a of FIG. 2 under small drop-out conditions. As illustrated in FIG. 4, under small drop-out conditions the error signal $V_{ERROR}$ is greater than $V_{RAMP\_MAX}$. In this condition, the buck converter 102a is in saturation and is no longer controlled because the error signal $V_{ERROR}$ is beyond the buck converter control loop dynamic range because it has exceeded the bound of $V_{RAMP\_MIN}$ to $V_{RAMP\_MAX}$. As long as the output signal $V_{OUT}$ is lower than $V_{REF}$, the integrator 114 increases the error voltage $V_{ERROR}$. When $V_{ERROR}$ reaches $V_{REF\_LDO}$ which is equal to $V_{RAMP\_MAX}$+the predetermined threshold value, the LDO regulator 104a begins to source current to the common output node 110 and to regulate the output voltage $V_{OUT}$. It should be understood that if voltage regulation was not insured by the LDO regulator 104a and the output voltage $V_{OUT}$ was not controlled the error signal $V_{ERROR}$ would rise up to the battery voltage $V_{BAT}$. When the buck converter 102a is in saturation it has a one hundred percent (100%) PWM duty cycle and provides its maximum source current. The LDO regulator 104a sources additional current $I_2$ from the battery supply voltage to ensure proper regulation of the output voltage $V_{OUT}$. In addition, due to the high resistivity of the equivalent series resistance (ESR) of the buck inductor 124a between the battery voltage $V_{BAT}$ and the output voltage $V_{OUT}$, the output current from the LDO regulator 104a is prevented from entering the buck converter 102a such that the current supplied by the LDO regulator 104a is substantially entirely provided to the load 112.

Figure 5A:
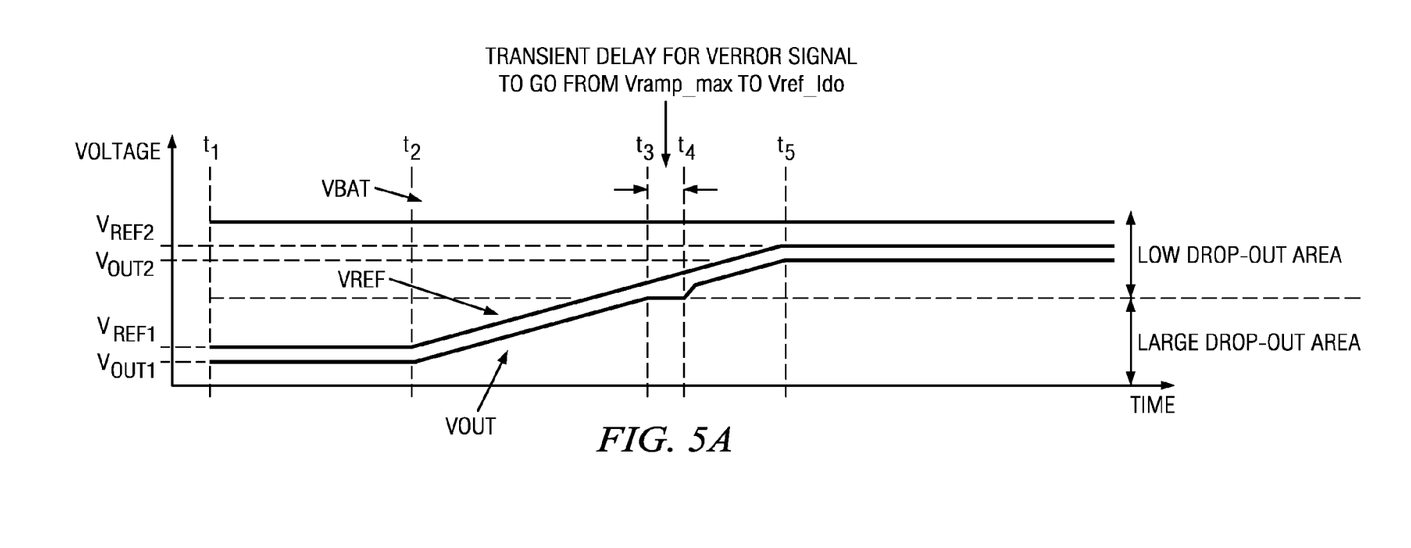
FIGS. 5A-5D illustrate example voltage and current values for the voltage regulation circuit of FIG. 2 during large drop-out and low drop-out conditions.
Figure 5B:
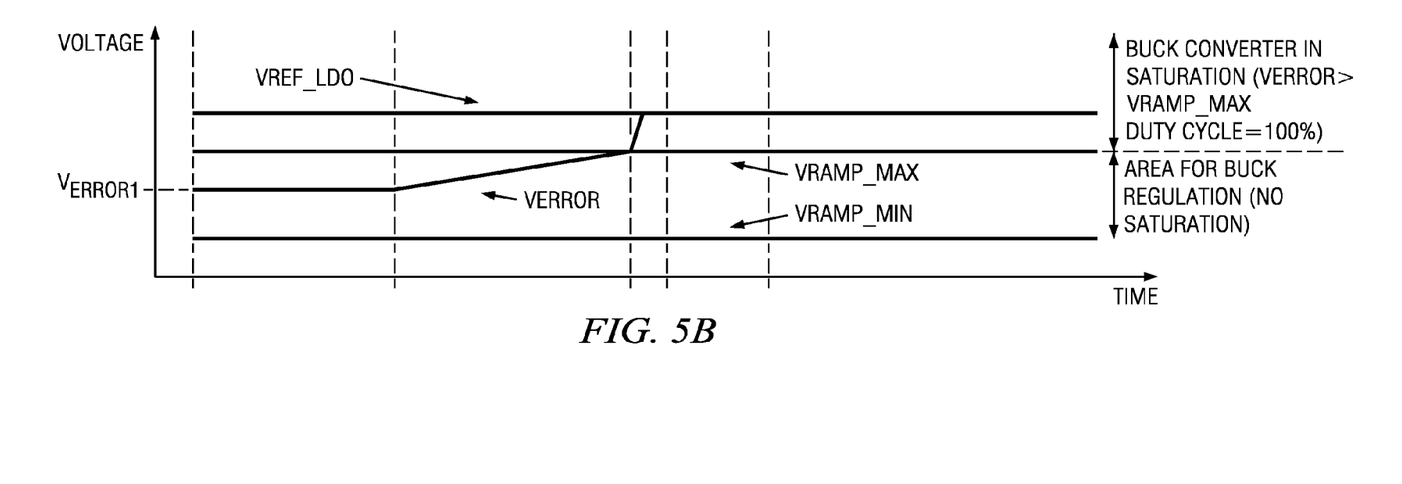
Figure 5C:
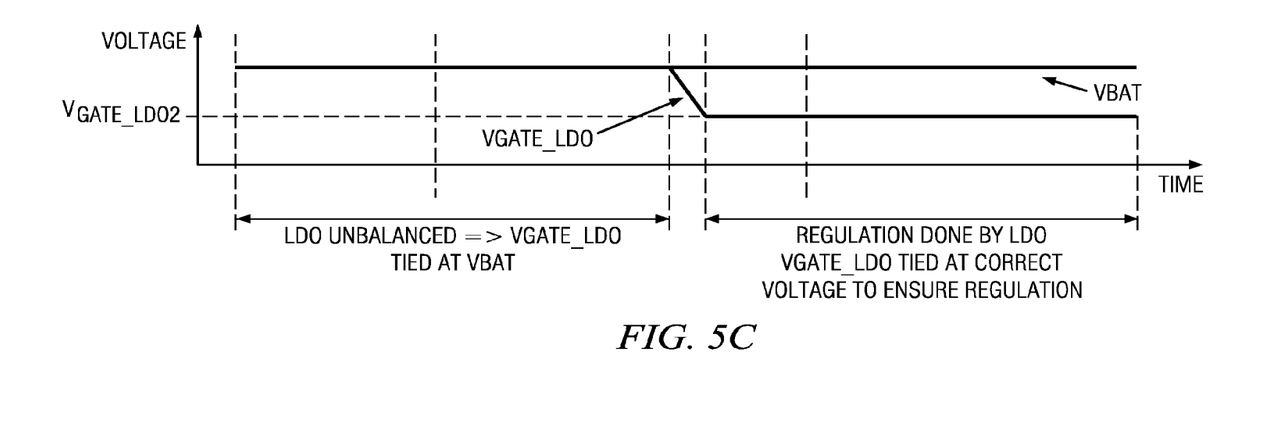
Figure 5D:
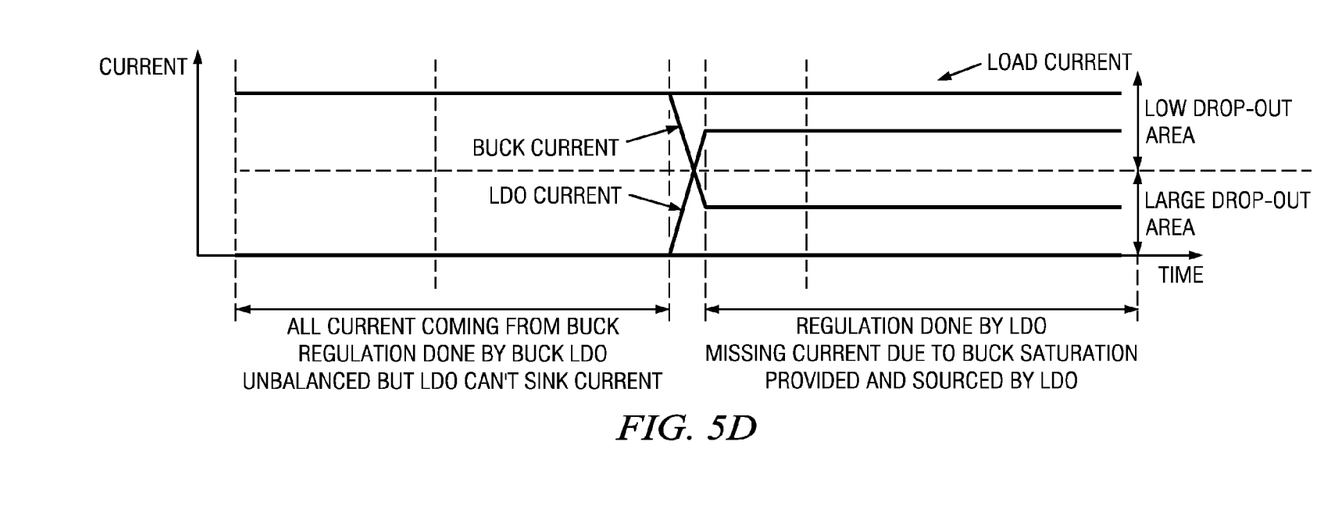

FIGS. 5A-5D illustrate example voltage and current values for the voltage regulation circuit of FIG. 2 during large drop-out and low drop-out conditions. FIG. 5A illustrates example voltage values of the reference voltage $V_{REF}$ and output voltage $V_{OUT}$ of the voltage regulation circuit of FIG. 2 during large drop-out and low drop-out conditions. FIG. 5B illustrates example voltage values of the error voltage $V_{ERROR}$ for the voltage regulation circuit of FIG. 2 during large drop-out and low drop-out conditions. FIG. 5C illustrates example voltage values of the gate voltage $V_{GATE\_LDO}$ of the LDO regulator of FIG. 2 during large drop-out and low drop-out conditions. FIG. 5D illustrates example current values delivered to the load by the voltage regulation circuit of FIG. 2 during large drop-out and low drop-out conditions. Referring to FIG. 5A, the voltage values of $V_{BAT}$, $V_{OUT}$ and $V_{REF}$ are illustrated as the voltage regulation circuit of FIG. 2 transitions from a large drop-out voltage area of operation to a low drop-out voltage area of operation. At a time $t_1$ the output voltage $V_{OUT}$ has an initial output voltage $V_{OUT1}$ corresponding to an initial reference voltage value of $V_{REF1}$. As illustrated in FIG. 5A, the source voltage $V_{BAT}$ is greater than that of the reference voltage $V_{REF}$ and output voltage $V_{OUT}$. At time $t_1$, the buck converter is operating in a large drop-out voltage condition in which it is in a normal mode of operation and not in saturation. As shown in FIG. 5B, the error signal $V_{ERROR}$ has an initial value $V_{ERROR1}$, and lies between $V_{RAMP\_MIN}$ and $V_{RAMP\_MAX}$. As seen in FIG. 5C at time $t_1$, the voltage value of $V_{GATE\_LDO}$ output from the LDO op am 126a is the same as the voltage value of $V_{BAT}$. As result the LDO regulator is in an unbalanced condition which ties $V_{GATE\_LDO}$ to $V_{BAT}$. As illustrated in FIG. 5D, all current to the load is being provided by the buck converter 102a, and the LDO regulator 104a does not provide any current. All voltage regulation during this time is performed by the buck converter 102a.

At time $t_2$, it is desired to increase the output voltage $V_{OUT}$ from an initial value $V_{OUT1}$ to a second value $V_{OUT2}$ by setting the reference voltage $V_{REF}$ to a second reference voltage value $V_{REF2}$. As seen in FIG. 5A, the reference voltage $V_{REF}$ begins to ramp towards the second reference voltage value $V_{REF2}$ and the output voltage $V_{OUT}$ ramps upward in response. As illustrated in FIG. 5B, the error signal $V_{ERROR}$ also ramps upward. As illustrated in FIG. 5C however, the voltage $V_{GATE\_LDO}$ remains at $V_{BAT}$. And as illustrated in FIG. 5D, the load current delivered to the load 112 continues to be provided solely by the buck converter 102a.

At time $t_3$, the buck converter 102a has reached the saturation mode before the output voltage $V_{OUT}$ has reached the desired second output voltage $V_{OUT2}$. As shown in FIG. 5B, the error voltage $V_{ERROR}$ is greater than $V_{RAMP\_MAX}$ and the duty cycle of the buck converter 102a has reached one hundred percent (100%). As further shown in FIG. 5B at time $t_3$, the error signal $V_{ERROR}$ ramps towards $V_{REF\_LDO}$. As illustrated in FIG. 5C, the voltage $V_{GATE\_LDO}$ ramps downward towards a second gate voltage $V_{GATE\_LDO2}$. As illustrated in FIG. 5D, the current provided by the buck converter 102a labeled "buck current" begins decreasing while the current provided by the LDO regulator 104a labeled "LDO current" begins increasing once the error signal $V_{ERROR}$ reaches the voltage level of $V_{REF\_LDO}$.

At time $t_4$, the output voltage $V_{OUT}$ again begins tracking the reference voltage $V_{REF}$ as illustrated in FIG. 5A. As illustrated in FIG. 5C and FIG. 5D, at time $t_4$ the voltage $V_{GATE\_LDO}$ of the LDO regulator 104a is at the $V_{GATE\_LDO2}$ value and voltage regulation of the output is performed by the LDO regulator 104a with $V_{GATE\_LDO}$ being tied at the voltage $V_{GATE\_LDO2}$ to insure regulation of the output voltage. In addition, the total current provided to the load 112 is provided both by the buck converter 102a and the LDO regulator 104a so that the total current provided to the load remains substantially the same. The time period between $t_3$ and $t_4$ represents a transient delay for the error signal $V_{ERROR}$ to transition from $V_{RAMP\_MAX}$ to $V_{REF\_LDO}$. The slope of the transient delay depends on the characteristics of the integrator 114 as well as other characteristics of the voltage regulation circuit. In a particular embodiment, this transient delay may be one or two microseconds but may be minimized by design choice. As illustrated in FIG. 5A, during the transient period between $t_3$ and $t_4$ the output voltage $V_{OUT}$ remains constant.

At time $t_5$, the reference voltage $V_{REF}$ has reached the second reference voltage level $V_{REF2}$ as illustrated in FIG. 5A. As further shown in FIG. 5A, the output voltage has reached the second output voltage level $V_{OUT2}$. In addition, as illustrated in FIG. 5B, the error voltage $V_{ERROR}$ has reached the voltage level $V_{REF\_LDO}$. As illustrated in FIG. 5C, voltage $V_{GATE\_LDO}$ has reached the second voltage level $V_{GATE\_LDO2}$. Further, as illustrated in FIG. 5D, the load current continues to be provided by both the buck converter and the LDO regulator such that during the entire time between $t_1$ to $t_5$ the load current remains substantially constant because missing current due to saturation of the buck converter 102a is provided and sourced by the LDO regulator 104a during which voltage regulation is performed by the LDO regulator 104a.

Various embodiments provide for a combined buck converter and LDO regulator configured in parallel with a single feedback loop allowing the buck converter and LDO regulator to output current simultaneously. This arrangement eliminates discontinuity in the time domain that would occur if two dedicated feedback loops were used to control each of the buck converter and LDO regulator. With two separate control loops, simultaneous operation is not possible as there would be a need to switch one of the buck converter or LDO regulator off before switching on the other, and as such it would not be possible to have a continuous output voltage in the time domain. The combined buck converter and LDO regulator arranged in parallel with a single feedback loop provides for an automatic change from a large drop-out condition in which the buck converter is operating in a normal non-saturated mode to a low drop-out condition in which the buck converter and the LDO regulator are operating simultaneously. Thus, when the drop-out is large enough, only the buck converter operates to provide current to the load which results in efficiency of operation of the voltage regulation circuit. Under small drop-out conditions, the LDO regulator regulates the output voltage when the buck converter is in saturation while part of the output current is still provided from the buck converter in addition to the additional current provided by the LDO regulator. Further, when the buck converter is in the saturation mode, the LDO regulator provides for the benefit of providing current that does not pass through the additional resistive path associated with the buck converter due to the equivalent series resistance (ESR) caused by the output inductor coil of the buck converter.

Figure 6:
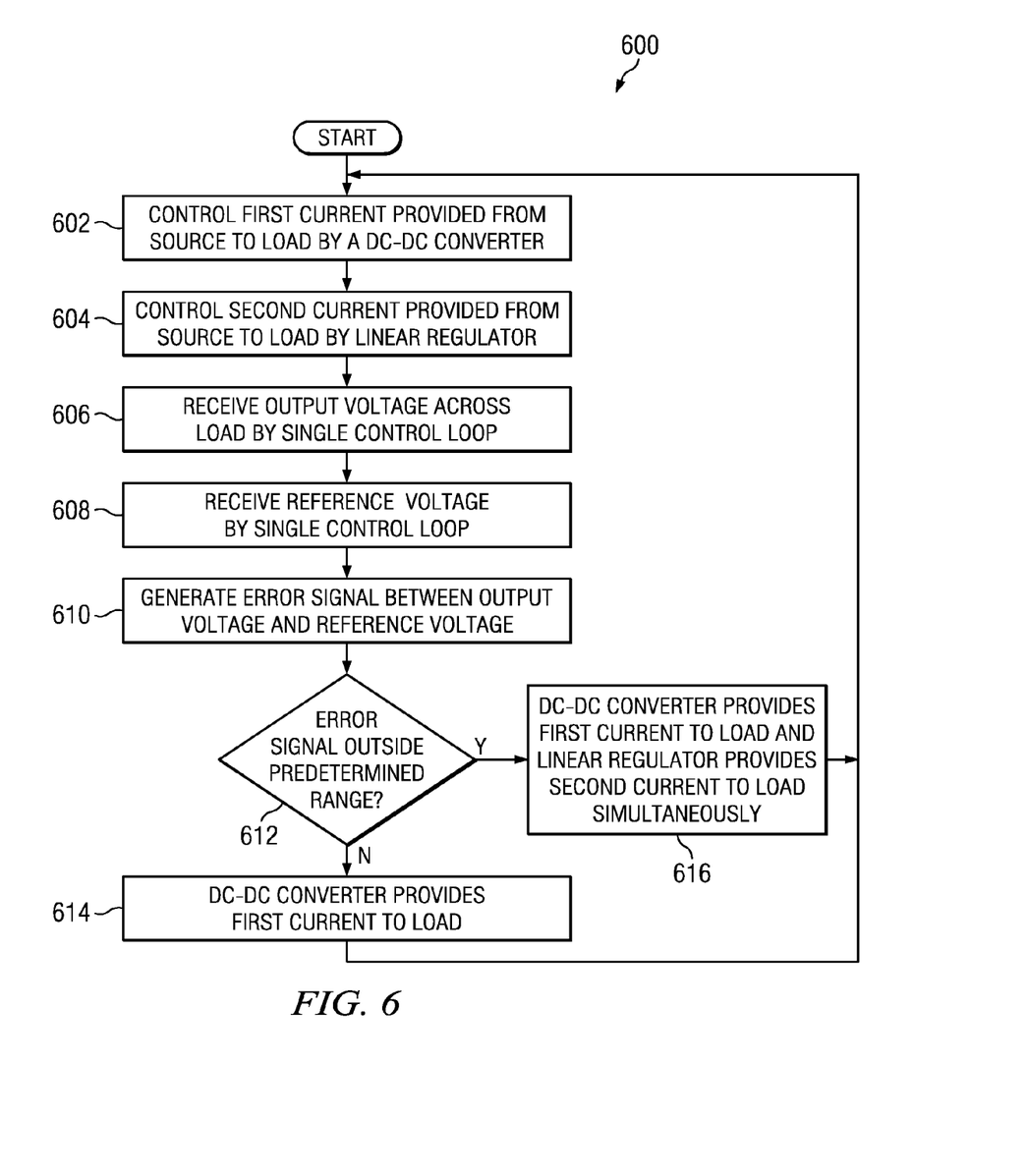
FIG. 6 illustrates an embodiment of a procedure for regulating voltage delivered to a load.

FIG. 6 illustrates an embodiment of a procedure 600 for regulating voltage delivered to a load. In step 602, a first current provided from a source to a load is controlled by a DC-DC converter. In step 604, a second current provided from the source to the load is controlled by a linear regulator. In step 606 a single control loop receives an output voltage across the load. In step 608, the single control loop receives a reference voltage. In step 610, the single control loop generates an error signal between the output voltage and the reference voltage. In step 612, it is determined whether the error signal is outside of a predetermined range. If it is determined that the error signal is not outside of the predetermined range, the procedure 600 continues to step 614 in which the DC-DC converter provides the first current to the load and the linear regulator does not provide the second current to the load. If it is determined that the error signal is output of the predetermined range, the procedure 600 continues to step 616 in which the DC-DC converter provides the first current to the load and the linear regulator provides the second current to the load simultaneously. After either of step 614 or step 616, the procedure 600 returns to step 602.

It will be appreciated by those skilled in the art having the benefit of this disclosure that this single feedback loop for parallel architecture buck converter—LDO regulator provides voltage regulation under both large drop-out and low drop-out voltage conditions. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A voltage regulation circuit comprising:
 a direct current to direct current (DC-DC) converter configured to control a first current provided from a source to a load via a first output;
 a linear regulator configured to control a second current provided from the source to the load via a second output;
 a single control loop configured to receive an output voltage across the load and a first reference voltage, the single control loop being further configured to generate a single error signal between the output voltage across the load and the first reference voltage and to control the DC-DC converter and the linear regulator using the single error signal such that when the single error signal is outside of a predetermined range the DC-DC converter provides the first current to the load and the linear regulator provides the second current to the load simultaneously; wherein the single control loop comprises an integrator configured to receive the output voltage and the first reference voltage, the integrator further configured to integrate an error between the output voltage and the first reference voltage to generate the single error signal; and wherein the linear regulator comprises a differential amplifier having a negative input configured to receive the single error signal from the integrator and a positive input configured to receive a second reference voltage.

2. The voltage regulation circuit of claim 1, wherein the control loop is further configured to control the DC-DC converter and the linear regulator using the single error signal such that when the single error signal is within the predetermined range the DC-DC converter provides the first current to the load and the linear regulator does not provide the second current to the load.

3. The voltage regulation circuit of claim 1, wherein the DC-DC converter comprises a buck converter.

4. The voltage regulation circuit of claim 1, wherein the linear regulator comprises a low dropout (LDO) regulator.

5. The voltage regulation circuit of claim 1, wherein the DC-DC converter comprises:
a signal generator configured to generate a periodic signal varying between a maximum value and a minimum value;
a comparator configured to receive the single error signal from the integrator and the period signal from the signal generator, the comparator further configured to compare the single error signal and the periodic signal and generate a first control signal based upon the comparing to control the providing of the first current from the source to the load.

6. The voltage regulation circuit of claim 5,
wherein the second reference voltage is equal to the maximum value of the periodic signal plus a predetermined threshold value, and wherein when the single error signal is greater than or equal to the second reference voltage the differential amplifier is further configured to generate a second control signal to enable the providing of the second current from the source to the load.

7. The voltage regulation circuit of claim 6, wherein when the single error signal is less than the second reference voltage the differential amplifier is configured to disable the providing of the second current from the source to the load.

8. The voltage regulation circuit of claim 1, wherein the first output of the DC-DC converter is coupled to the second output of the linear regulator.

9. The voltage regulation circuit of claim 1, wherein the predetermined range includes an operational voltage range of the DC-DC converter in which the DC-DC converter is not in a saturation mode.

10. A method of regulating voltage delivered to a load comprising:
controlling, by a direct current to direct current (DC-DC) converter, a first current provided from a source to a load via a first output;
controlling, by a linear regulator, a second current provided from the source to the load via a second output; wherein controlling the second current by the linear regulator comprises:
receiving a single error signal at a negative input of a differential amplifier; and
receiving a second reference voltage at a positive input of the differential amplifier, the second reference voltage being equal to the maximum value of a periodic signal plus a predetermined threshold value;
receiving, by a single control loop, an output voltage across the load and a first reference voltage;
generating, by the single control loop, a single error signal between the output voltage across the load and the first reference voltage; wherein generating the single error signal comprises:
receiving the output voltage and the first reference voltage; and
integrating an error between the output voltage and the first reference voltage to generate the single error signal; and
controlling the DC-DC converter and the linear regulator using the single error signal such that when the single error signal is outside of a predetermined range the DC-DC converter provides the first current to the load and the linear regulator provides the second current to the load simultaneously.

11. The method of claim 10, further comprising controlling the DC-DC converter and the linear regulator using the single error signal such that when the single error signal is within the predetermined range the DC-DC converter provides the first current to the load and the linear regulator does not provide the second current to the load.

12. The method of claim 10, wherein the DC-DC converter comprises a buck converter.

13. The method of claim 10, wherein the linear regulator comprises a low dropout (LDO) regulator.

14. The method of claim 10, wherein controlling the first current by the DC-DC converter further comprises:
generating the periodic signal such that the periodic signal varies between a maximum value and a minimum value;
receiving the single error signal by a comparator;
receiving the periodic signal by the comparator;
comparing, by the comparator, the single error signal and the periodic signal; and
generating, by the comparator, a first control signal based upon the comparing to control the providing of the first current from the source to the load.

15. The method of claim 14, wherein controlling the second current by the linear regulator further comprises:
generating, by the differential amplifier, a second control signal to enable the providing of the second current from the source to the load when the single error signal is greater than or equal to the second reference voltage.

16. The method of claim 15 further comprising disabling the providing of the second current from the source to the load when the single error signal is less than the second reference voltage.

17. The method of claim 10, wherein the first output of the DC-DC converter is coupled to the second output of the linear regulator.

18. The method of claim 10, wherein the predetermined range includes an operational voltage range of the DC-DC converter in which the DC-DC converter is not in a saturation mode.

* * * * *